(12) United States Patent
Liaw et al.

(10) Patent No.: US 8,059,912 B2
(45) Date of Patent: Nov. 15, 2011

(54) METHOD FOR AN IMAGE ADJUSTMENT

(75) Inventors: Ming-Jiun Liaw, Hsinchu (TW);
Yen-Ping Teng, Hsinchu (TW)

(73) Assignee: Altek Corporation, Hsinchu (TW)

( * ) Notice: Subject to any disclaimer, the term of this patent is extended or adjusted under 35 U.S.C. 154(b) by 646 days.

(21) Appl. No.: 12/254,062

(22) Filed: Oct. 20, 2008

(65) Prior Publication Data
US 2009/0041372 A1    Feb. 12, 2009

(30) Foreign Application Priority Data
Nov. 5, 2007   (TW) ............................... 96141762 A

(51) Int. Cl.
*G06K 9/40*   (2006.01)
(52) U.S. Cl. ........................................ 382/266; 382/270
(58) Field of Classification Search .................... 382/266
See application file for complete search history.

(56) References Cited

U.S. PATENT DOCUMENTS

| | | | | |
|---|---|---|---|---|
| 4,084,179 A | * | 4/1978 | Sekiguchi | 348/339 |
| 5,822,469 A | * | 10/1998 | Silverstein | 382/267 |
| 5,852,475 A | * | 12/1998 | Gupta et al. | 348/606 |
| 6,094,508 A | * | 7/2000 | Acharya et al. | 382/199 |
| 6,195,467 B1 | * | 2/2001 | Asimopoulos et al. | 382/261 |
| 6,360,024 B1 | * | 3/2002 | Tan et al. | 382/260 |
| 7,003,173 B2 | * | 2/2006 | Deshpande | 382/261 |
| 7,079,281 B1 | * | 7/2006 | Ng et al. | 358/1.9 |
| 2003/0081854 A1 | * | 5/2003 | Deshpande | 382/261 |
| 2009/0041372 A1 | * | 2/2009 | Liaw et al. | 382/264 |

* cited by examiner

*Primary Examiner* — Sath V Perungavoor
(74) *Attorney, Agent, or Firm* — Alan Kamrath; Kamrath & Associates PA

(57) ABSTRACT

A method for an image adjustment is disclosed. The method comprises the steps of: reading an interested pixel and its plural neighboring pixels from an image storage device; determining a so-called first gradient value of the first direction and a so-called second gradient value of the second direction, wherein the first direction is the orthogonal direction of the second direction; comparing the first and the second gradient values; executing a sharpness adjustment to the interested pixel along the direction which has larger gradient value; then executing a noise reduction or smoothing adjustment to the interested pixel along the direction which has smaller gradient value; and repeating the steps until all interested pixels are processed and obtaining a new pixel value.

17 Claims, 4 Drawing Sheets

METHOD FOR AN IMAGE ADJUSTMENT

BACKGROUND OF THE INVENTION

1. Field of the Invention

The present invention relates to a method for an image adjustment, and more particularly, to a method for enhancing a sharpness of a partial area of an image and then executing a noise reduction to the partial area.

2. Description of the Related Art

As technology advances, digital image processing devices are more popular and equipped with more functions. Therefore, users expect their digital image processing devices to render the clearest image.

Previously, all kinds of image sharpening and noise reducing techniques have been widely employed in related fields. However, common digital image processing devices choose to either sharpen all pixels of an interested image first followed by smoothing or smoothing all pixels of an interested image first followed by sharpening. So, at least two image processing blocks, sharpening and smoothing function blocks, are in the common image processing devices. In such kind of image processors, annoying artifacts usually occurs in the image after it is sharpened. And smoothing sometimes can not remove these kinds of artifacts. Therefore the image quality is downgrade.

Hence, it is necessary to provide a new digital image processing scheme to solve the problems encountered in the prior art.

SUMMARY OF THE INVENTION

The object of the present invention is reducing annoying artifacts caused by sharpening. To achieve the object, the invention sharpens a single interested pixel of the interested image in one direction and then smoothes it in its orthogonal direction at the same image processing block and repeat the sharpening and smoothing until all interested pixels of the interested image are processed. The digital image processing device disclosed in the present invention comprises an image storage device and a processor. The image storage device stores interested images. The processor executes a sharpness adjustment in one direction and a smoothing adjustment in its orthogonal direction to the interested images.

First the processor reads the interested pixel and its neighboring pixels from the image storage device. Then the processor calculates a first gradient value of a first direction of the interested pixel and its plural neighboring pixels and a second gradient value of a second direction of the interested pixel and its plural neighboring pixels, then compares a difference between the first and the second gradient values, wherein the first direction is orthogonal to the second direction. If the absolute value of the difference between the two gradient values is larger than the first pre-determined threshold value, then the processor executes a sharpness adjustment to the interested pixel along the direction which has larger gradient value; and executes a smoothing adjustment along the direction which has smaller gradient value.

If the absolute value of the difference between the two gradient values is not larger than the first pre-determined threshold value, then it is determined if any one of the two gradient values is larger than a second pre-determined threshold value, if the two gradient values are both smaller than the second pre-determined threshold value, then the processor preserves the original pixel value of the interested pixel or executes a smoothing adjustment to the interested pixel; if either one of the two gradient values is not smaller than the second pre-determined threshold value, then execute a sharpness adjustment only.

After processing the above steps, not only the border of the interested pixel is sharpened, but the artifacts produced by sharpening can be also removed by the smoothing in the orthogonal direction. The image quality is kept.

DETAILED DESCRIPTION OF THE PREFERRED EMBODIMENT

The advantages and innovative features of the invention will become more apparent from the following detailed description when taken in conjunction with the accompanying drawings.

Figure 1:
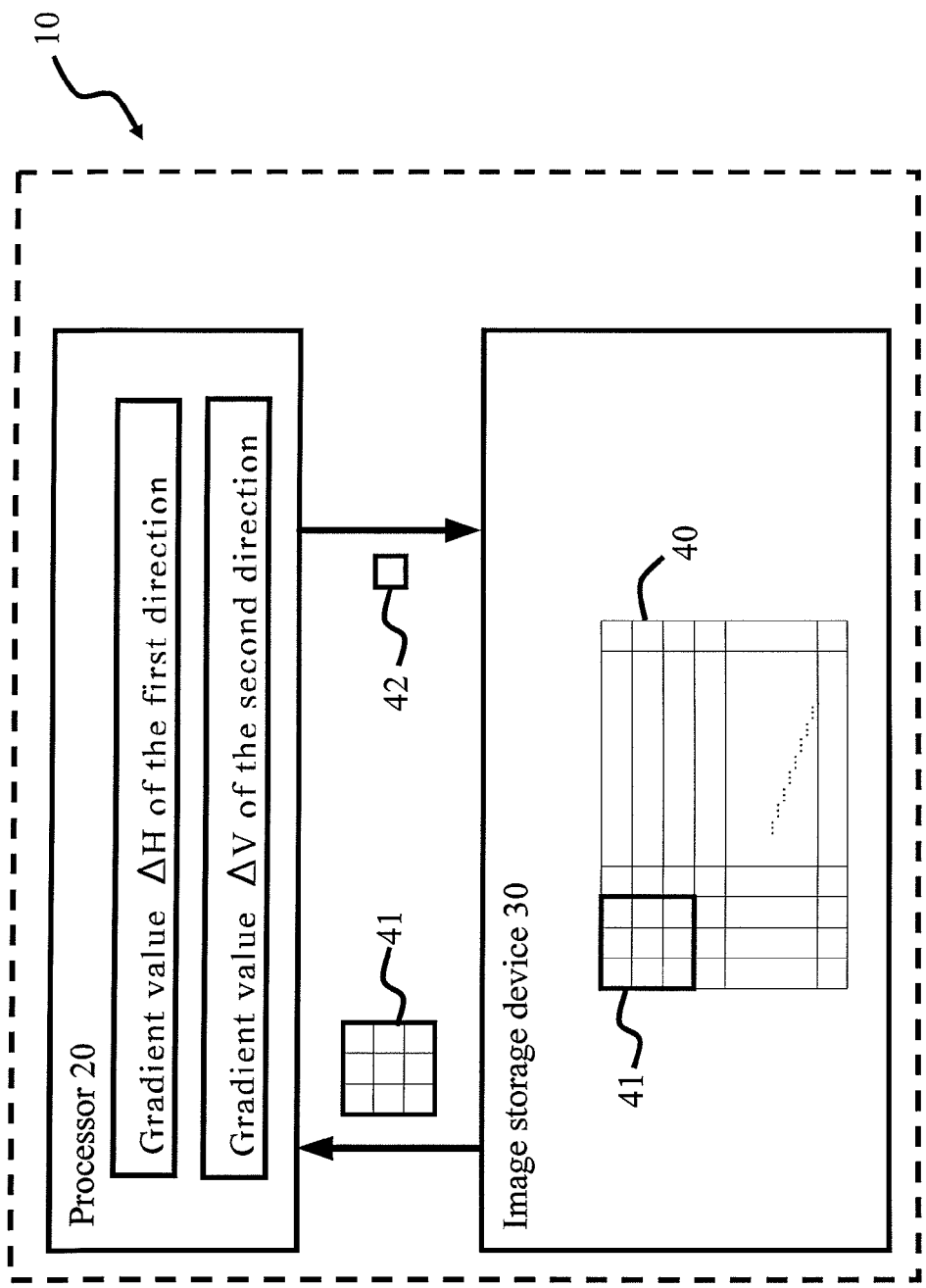
FIG. 1 illustrates a structural view in accordance with the present invention.

Please refer to FIG. 1, which illustrates a structural view in accordance with the present invention.

The digital image processing device 10 includes a processor 20 and an image storage device 30. The processor 20 electrically couples with the image storage device 30. The image storage device 30 is used for storing at least an interested image 40 which contains plural pixels. The processor 20 process the image pixel by pixel. When the processor 20 is processing one interested pixel, the processor 20 reads the interested pixel and its plural neighboring pixels 41 from the image storage device 30 for processing. After processing, the processor 20 writes a new pixel value 42 to the image storage device 30.

Figure 2:
FIG. 2 schematically illustrates an interested pixel and its neighboring pixels in accordance with the present invention.

The interested pixel and its plural neighboring pixels 41 are shown in FIG. 2, which is a schematic view of the interested pixel, with a plurality of pixels Y11~Y33. The interested pixel and its plural neighboring pixels 41 includes the interested pixel Y22 and its plural neighboring pixels Y11, Y12, Y13, Y21, Y23, Y31, Y32, and Y33. At first the processor 20 reads the interested pixel Y22 and its plural neighboring pixels Y11, Y12, Y13, Y21, Y23, Y31, Y32, and Y33 from the image storage device 30 and calculates a gradient value ΔH of the first direction and a gradient value ΔV of the second direction between the interested pixel Y22 and its plural neighboring pixels Y11, Y12, Y13, Y21, Y23, Y31, Y32, and Y33, wherein the two directions are orthogonal to each other.

In this embodiment, the first direction is, but not limited to, a horizontal direction of the interested pixel Y22 and its plural neighboring pixels, the second direction is, but not limited to, a vertical direction of the interested pixel Y22 and its plural neighboring pixels. The processor 20 uses the gradient value ΔH of the first direction and the gradient value ΔV of the second direction to determine how to proceed with certain image processing works to obtain the new pixel value 42. The method of obtaining the gradient value ΔH of the first direction and the gradient value ΔV of the second direction and the processing flow of the processor 20 will be described thereafter.

Figure 3A:
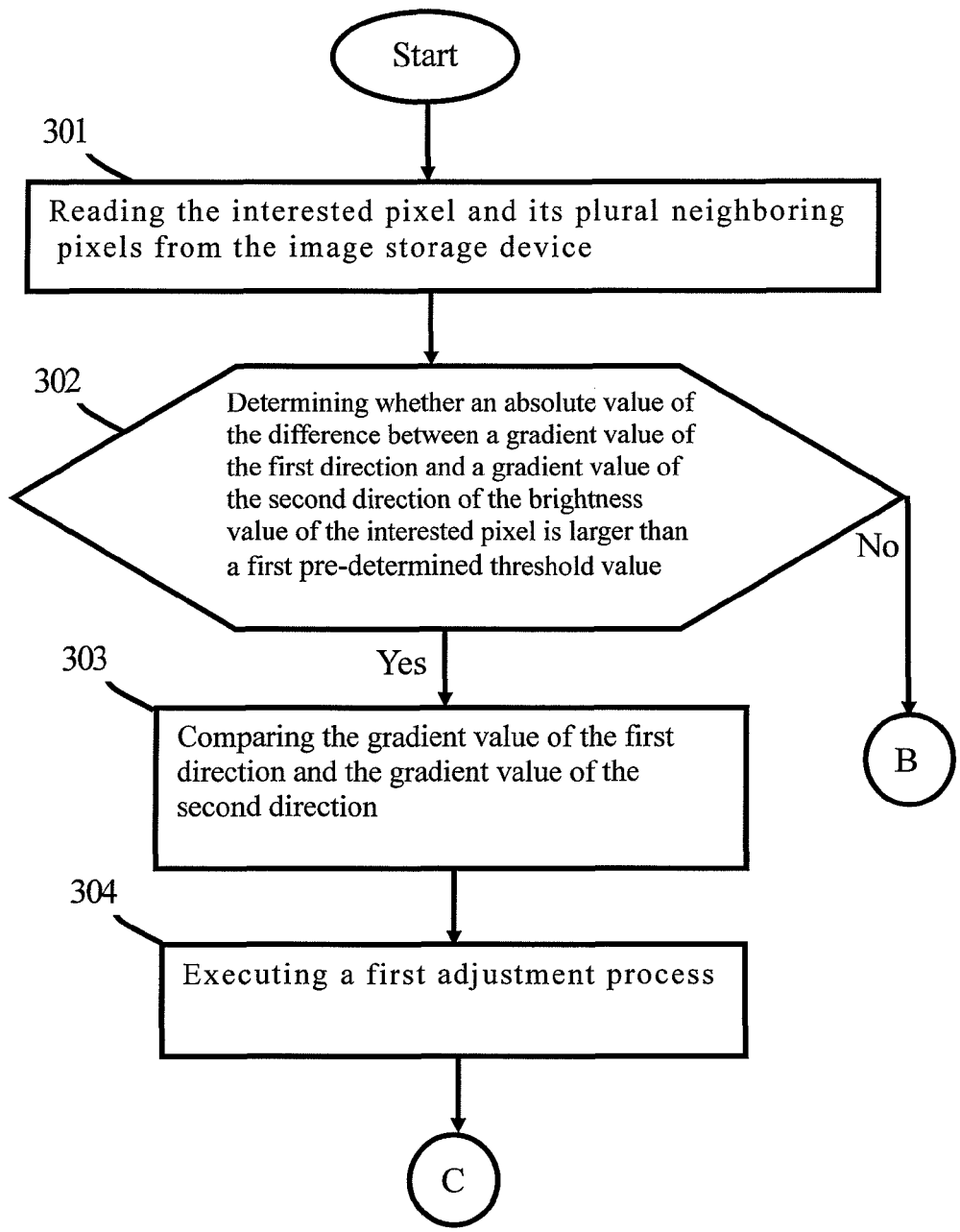
FIGS. 3A and 3B are flow charts illustrating a method for an image adjustment in accordance with the present invention.
Figure 3B:
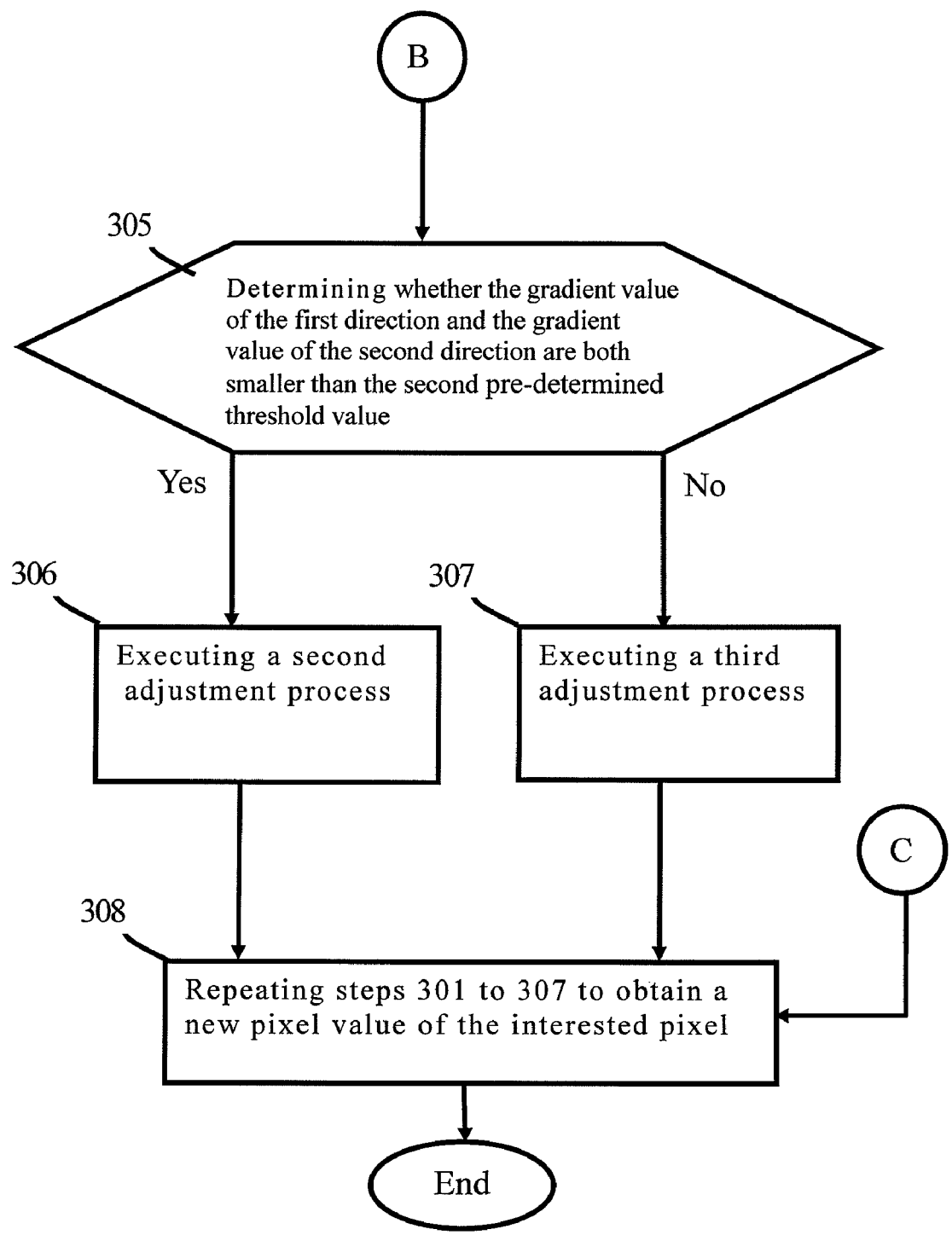

FIGS. 3A and 3B describe details of a method for an image adjustment in accordance with the present invention. For better understanding, the brightness value of the interested pixel is denoted as Y22, and the brightness values of it plural neighboring values are denoted as Y11, Y12, Y13, Y21, Y23, Y31, Y32, and Y33 respectively.

The process first goes to step 301: reading the interested pixel, Y22, and its plural neighboring pixels, Y11, Y12, Y13, Y21, Y23, Y31, Y32, and Y33, of the interested image from the image storage device 30.

The process then continues to step 302: determining whether an absolute value of the difference between a gradient value $\Delta H$ of the first direction and a gradient value $\Delta V$ of the second direction of the brightness value of the interested pixel Y22 is larger than a first pre-determined threshold value.

In this embodiment, the gradient value $\Delta H$ of the first direction is the sum of an absolute value of the difference between Y21 and Y22 and an absolute value of the difference between Y23 and Y22, that is:

$$\Delta H=|Y21-Y22|+|Y23-Y22|$$

The gradient value $\Delta V$ of the second direction is the sum of an absolute value of the difference between Y12 and Y22 and an absolute value of the difference between Y32 and Y22, that is:

$$\Delta V=|Y12-Y22|+|Y32-Y22|$$

If the absolute value of the difference between the gradient value $\Delta H$ of the first direction and the gradient value $\Delta V$ of the second direction is larger than a certain threshold value, it means that the interested pixel Y22 has an obvious image border with its plural neighboring pixels, then the process goes to step 303. If the absolute value of the difference between the gradient value $\Delta H$ of the first direction and the gradient value $\Delta V$ of the second direction is not larger than a certain threshold value, then the process directly goes to step 306. In short, If $|\Delta H - \Delta V| > TH1$, then goto step 303.

Else goto step 306.

Wherein, TH1 is a pre-determined threshold.

Step 303: comparing the gradient value $\Delta H$ of the first direction and the gradient value $\Delta V$ of the second direction. If the gradient value $\Delta H$ of the first direction is larger, then the brightness value of the interested pixel Y22 has greater variation along the first direction. If the gradient value $\Delta V$ of the second direction is larger, then the image border has greater variation along the second direction.

Then the process goes to step 304: executing a first adjustment process.

The first adjustment process comprises the steps of: executing a sharpness adjustment along the direction which has larger gradient value; and executing a smoothing adjustment along the direction which has smaller gradient value.

In this embodiment, suppose the gradient value $\Delta H$ of the first direction is larger than the gradient value $\Delta V$ of the second direction. Then the sharpness adjustment is applied to the first direction of the interested pixel Y22 to enhance sharpness. In this embodiment, the processor 20 magnifies the gradient value $\Delta H$ of the first direction to obtain a first new gradient value, then adding the first new gradient value to the original pixel value to obtain a new pixel value. In other words, the processor 20 applies a sharpness mask to the brightness values of the interested pixel Y22 and its plural horizontal neighboring pixels. The sharpness mask is in the form of a matrix, which can work with the brightness value of the interested pixel Y22.

In this embodiment, the sharpness mask of the first direction can be:

$$\frac{\begin{bmatrix} 0 & 0 & 0 \\ -1 & 2 & -1 \\ 0 & 0 & 0 \end{bmatrix}}{2} \text{ or } \frac{\begin{bmatrix} -1 & 2 & -1 \\ -2 & 4 & -2 \\ -1 & 2 & -1 \end{bmatrix}}{8} \text{ If } \frac{\begin{bmatrix} 0 & 0 & 0 \\ -1 & 2 & -1 \\ 0 & 0 & 0 \end{bmatrix}}{2}$$

is used, the equation for sharpness adjustment is:

$$Y22'=Y22+\text{coefficient}*(-Y21+2*Y22-Y23)/2$$

An adjusted brightness value Y22' is obtained by using the above equation, wherein the coefficient can be varied depending on implementaion, the coefficient is not used for limiting the present invention.

After the sharpness adjustment, the processor 20 executes the smoothing adjustment along the orthogonal direction of the first direction (that is, the second direction of the interested pixel Y22). In this embodiment, the smoothing adjustment is executed by using a smoothing mask, such as a low pass filter. The smoothing mask processes the adjusted brightness value Y22' of the interested pixel and then obtained a smoothed brightness value Y22". The smoothing mask can also be in the form of a matrix.

In this embodiment, the smoothing mask of the second direction can be:

$$\frac{\begin{bmatrix} 0 & 1 & 0 \\ 0 & 2 & 0 \\ 0 & 1 & 0 \end{bmatrix}}{4} \text{ or } \frac{\begin{bmatrix} 1 & 4 & 1 \\ 2 & 8 & 2 \\ 1 & 4 & 1 \end{bmatrix}}{24} \text{ If } \frac{\begin{bmatrix} 0 & 1 & 0 \\ 0 & 2 & 0 \\ 0 & 1 & 0 \end{bmatrix}}{4}$$

is used, the smoothing adjustment equation of this embodiment is:

$$Y22''=(Y12+2*Y22'+Y32)/4$$

Using the above equation, an smoothed brightness value Y22" is obtained after executing the sharpness adjustment along the first direction which has larger gradient value and then executing the smoothing adjustment along the second direction which has smaller gradient value.

It is noted that the present invention is not limited to the sharpness adjustment and the smoothing adjustment methods as described above, however, the smoothing adjustment must be executed along the orthogonal direction of the direction where the sharpness adjustment is executed to achieve the object of the present invention.

The present invention can also execute the sharpness and smoothing adjustment by referring to a look up table or a predetermined equation. For example, the present invention increases the first gradient value along the first direction by referring to the look up table, and adds back to original brightness value Y22 to obtain new brightness value Y22'. Then, for smoothing in the second direction, the present invention decreases the gradient value obtained from the adjusted brightness value Y22' and its plural neighboring pixels along the second direction. The way of using the predetermined equation is similar to that of using the look up table, since both are familiar to those who skilled in the art, it will not be further described for the sake of brevity.

Besides, if the gradient value $\Delta H$ of the first direction is smaller than the gradient value $\Delta V$ of the second direction, then the image sharpness adjustment is applied to the second direction of the interested pixel and the smoothing adjustment is applied to the first direction of the brightness value Y22 of the interested pixel. Therefore, the sharpness mask is:

$$\frac{\begin{bmatrix} 0 & -1 & 0 \\ 0 & 2 & 0 \\ 0 & -1 & 0 \end{bmatrix}}{2} \text{ or } \frac{\begin{bmatrix} -1 & -2 & -1 \\ 2 & 4 & 2 \\ -1 & -2 & -1 \end{bmatrix}}{8}$$

the smoothing mask is:

$$\frac{\begin{bmatrix} 0 & 0 & 0 \\ 1 & 2 & 1 \\ 0 & 0 & 0 \end{bmatrix}}{4} \text{ or } \frac{\begin{bmatrix} 1 & 2 & 1 \\ 4 & 8 & 4 \\ 1 & 2 & 1 \end{bmatrix}}{24}$$

Here, the steps of executing image sharpness adjustment and smoothing adjustment are the same as those described above, therefore they will not be further described for the sake of brevity.

In step 302, if the absolute value of the difference between the gradient value ΔH of the first direction and the gradient value ΔV of the second direction is smaller than the first pre-determined threshold value, it means that the position of the interested pixel is not on the image border or the interested pixel doesn't have an obvious image border. Then the process goes to step 305.

Step 305: determining whether the gradient value ΔH of the first direction and the gradient value ΔV of the second direction are both smaller than a second pre-determined threshold value.

At this time the processor 20 would again determine whether the gradient value ΔH of the first direction and the gradient value ΔV of the second direction are both smaller than the second pre-determined threshold value.

If both gradient values are smaller than the second pre-determined threshold value, the process goes to step 306: executing a second adjustment process. The second adjustment process comprises the steps of: executing a weaker sharpness adjustment, preserving the original pixel value of the interested pixel or executing the smoothing adjustment.

The way of executing the weaker sharpness adjustment is similar to that of executing the image sharpness adjustment in the first adjustment process. The weaker sharpness adjustment is applied by magnifying the gradient value ΔH of the first direction to obtain a second new gradient value, then adding the second new gradient value to the original pixel value to obtain a new pixel value. However, because there's little variation among the interested pixel and its plural neighboring pixels, therefore the adjustment scale of the weaker sharpness adjustment is smaller than that of the first adjustment process.

The smoothing adjustment is applied by using a 2-dimensional (2-D) low pass filter to obtain a final brightness value or by referring to a look up table in accordance with both the gradient value ΔH of the first direction and the gradient value ΔV of the second direction to decrease the gradient value of the interested pixel and its plural neighboring pixels to obtain the final brightness value. This adjustment process is similar to the method described in step 305, the difference lies in that the first adjustment process only executes the smoothing adjustment along the direction which has smaller gradient value, step 306 executes the smoothing adjustment along both the first and the second direction.

In this embodiment, the 2-D smoothing mask can be:

$$\frac{\begin{bmatrix} 0 & 1 & 0 \\ 1 & 2 & 1 \\ 0 & 1 & 0 \end{bmatrix}}{8}, \frac{\begin{bmatrix} 1 & 2 & 1 \\ 2 & 4 & 2 \\ 1 & 2 & 1 \end{bmatrix}}{16} \text{ or } \frac{\begin{bmatrix} 1 & 1 & 1 \\ 1 & 1 & 1 \\ 1 & 1 & 1 \end{bmatrix}}{9}.$$

or any other 2-D noise reduction techniques as known in the prior art.

If any one of the gradient value ΔH of the first direction and the gradient value ΔV of the second direction is larger than the second threshold value, then the process goes to step 307: executing a third adjustment process. The third adjustment process executes an image sharpness adjustment.

The third adjustment process refers to the gradient value ΔH of the first direction and the gradient value ΔV of the second direction and uses the look up table to increase the gradient values of the interested pixel and its plural neighboring pixels to obtain a final brightness value. The difference between the third adjustment process and the first adjustment process lies in that the first adjustment process only refers to the gradient value in one direction, while the third adjustment process in step 307 refers to the gradient value of the first and the second direction at the same time.

Since the smoothing process and the image sharpness adjustment process in step 306 and step 307 are similar to those described in the first adjustment process in step 304, therefore they will not be further described for the sake of brevity.

The process finally goes to step 308. The processor 20 repeats steps 301 to 307 until all the interested pixels are processed to obtain the new pixel value 42.

It is noted that the image adjustment method is not limited to the above orders, any order which can achieve the object of the present invention falls within the scope of the present invention.

Using the image adjustment method as described above, the digital image processing device 10 can obtain the best image effect.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A digital image processing device comprising:
   an image storage device for storing an interested pixel and its plural neighboring pixels; and
   a processor electrically coupled with the image storage device for processing the interested pixel and its plural neighboring pixels, wherein the digital image processing device uses the processor to:
   calculate a first gradient value of a first direction of the interested pixel and its plural neighboring pixels and a second gradient value of a second direction of the interested pixel and its plural neighboring pixels, wherein the first direction is orthogonal to the second direction;
   determine whether an absolute value of a difference between the first gradient value of the first direction and the second gradient value of the second direction is larger than a first pre-determined threshold value;

if so, it means that the interested pixel has an obvious image border, then execute a sharpness adjustment to the interested pixel along the direction which has larger gradient value; and
execute a smoothing adjustment along the direction which has smaller gradient value.

2. The digital image processing device as claimed in claim 1, wherein the processor executes the sharpness adjustment along the direction which has larger gradient value by referring to a look up table or a predetermined equation to increase the gradient value and then adding the increased gradient value to the interested pixel.

3. The digital image processing device as claimed in claim 1, wherein the processor executes the smoothing adjustment along the direction which has smaller gradient value by a low pass filter.

4. The digital image processing device as claimed in claim 1, wherein the processor executes the smoothing adjustment by referring to the look up table or the predetermined equation to decrease the gradient value along the direction of the image border of the interested pixel and then adding the decreased gradient value to the interested pixel.

5. An image adjustment method for a digital image processing device, the method comprising:
calculating a first gradient value of a first direction of the interested pixel and its plural neighboring pixels and a second gradient value of a second direction of the interested pixel and its plural neighboring pixels, wherein the first direction is orthogonal to the second direction;
determining whether an absolute value of a difference between the first gradient value of the first direction and the second gradient value of the second direction is larger than a first pre-determined threshold value or not;
if so, it means the interested pixel has an obvious image border, then executing a sharpness adjustment to the interested pixel along the direction which has larger gradient value and executing a smoothing adjustment along the direction which has smaller gradient value; and
if not, it means that the interested pixel doesn't have an obvious image border, then execute a weaker sharpness adjustment, preserving the original pixel value of the interested pixel or executing the smoothing adjustment.

6. The image adjustment method as claimed in claim 5, wherein the step of executing a sharpness adjustment comprises:
referring to a look up table or a predetermined equation to increase the gradient value along the direction which has larger gradient value to obtain a first increased gradient value; and
adding the first increased gradient value to the interested pixel.

7. The image adjustment method as claimed in claim 5, wherein the step of executing a weaker sharpness adjustment comprises:
referring to the look up table or the predetermined equation to increase the gradient value along the direction which has larger gradient value to obtain a second increased gradient value, wherein the second increased gradient value is smaller than the first increased gradient value; and
adding the second increased gradient value to the interested pixel.

8. The image adjustment method as claimed in claim 5, wherein the step of executing a smoothing adjustment comprises using a low pass filter along the direction which has smaller gradient value to obtain a new pixel value of the interested value.

9. The image adjustment method as claimed in claim 5, wherein the step of executing a smoothing adjustment comprises:
referring to the look up table or the predetermined equation to decrease the gradient value along the direction of the image border of the interested pixel to obtain a decreased gradient value; and
adding the decreased gradient value to the interested pixel.

10. An image adjustment method for a digital image processing device, the method comprising:
calculating a first gradient value of a first direction of an interested pixel and its plural neighboring pixels and a second gradient value of a second direction of the interested pixel and its plural neighboring pixels, wherein the first direction is orthogonal to the second direction;
determining whether an absolute value of a difference between the first gradient value of the first direction and the second gradient value of the second direction is larger than a first pre-determined threshold value or not;
if so, it means that the interested pixel has an obvious image border, then executing a first adjustment process;
if not, it means the interested pixel doesn't have an obvious image border, then comparing the gradient value of the first direction and the gradient value of the second direction with a second pre-determined threshold value respectively;
if the gradient value of the first direction and the gradient value of the second direction are both smaller than the second pre-determined threshold value, then executing a second adjustment process; and
if at least one of the gradient value of the first direction and the gradient value of the second direction is larger than the second pre-determined threshold value, then executing a third adjustment process; wherein the step of executing a first adjustment process comprises:
executing a sharpness adjustment along the direction which has larger gradient value; and
executing a smoothing adjustment along the direction which has smaller gradient value;
the step of executing a second adjustment process comprises:
executing a weaker sharpness adjustment; or
executing the smoothing adjustment; or
preserving the original pixel value of the interested pixel;
and the step of executing a third adjustment process comprises:
executing the sharpness adjustment by referring to the gradient value of the first direction and the gradient value of the second direction.

11. The image adjustment method as claimed in claim 10, wherein the step of executing the sharpness adjustment in the step of executing the first adjustment process comprises:
referring to a look up table or a predetermined equation to increase the gradient value along the direction which has larger gradient value to obtain a first increased gradient value; and
adding the first increased gradient value to the interested pixel.

12. The image adjustment method as claimed in claim 10, wherein the step of executing the weaker sharpness adjustment in the step of executing the second adjustment process comprises:

referring to the look up table or the predetermined equation to increase the gradient value along the direction which has larger gradient value to obtain a second increased gradient value; and adding the second increased gradient value to the interested pixel, wherein the second increased gradient value is smaller than the first increased gradient value.

13. The image adjustment method as claimed in claim 10, wherein the step of executing the smoothing adjustment in the step of executing the first adjustment process comprises:

executing the smoothing adjustment along the direction which has smaller gradient value by a low pass filter.

14. The image adjustment method as claimed in claim 10, wherein the step of executing the smoothing adjustment in the step of executing the first adjustment process comprises:

referring to the look up table or the predetermined equation to decrease the gradient value along the direction of the image border of the interested pixel to obtain a decreased gradient value, and adding the decreased gradient value to the interested pixel.

15. The image adjustment method as claimed in claim 10, wherein the step of executing the smoothing adjustment in the step of executing the second adjustment process is obtaining a new pixel value by a 2D low pass filter.

16. The image adjustment method as claimed in claim 10, wherein the step of executing the smoothing adjustment in the step of executing the second adjustment process comprises:

referring to the gradient values of the first direction and the second direction at the same time to use the look up table or the predetermined equation to decrease the gradient value of the interested pixel and its plural neighboring pixels, and adding the decreased gradient value to the interested pixel.

17. The image adjustment method as claimed in claim 10, wherein the step of executing the sharpness adjustment of the third adjustment process comprises the following steps:

referring to the gradient values of the first direction and the second direction at the same time to use the look up table or the predetermined equation to increase the gradient value of the interested pixel and its plural neighboring pixels of the first direction and the second direction, and adding the increased gradient value to the interested pixel.

* * * * *